Feb. 16, 1954    P. A. KETCHPEL ET AL    2,669,414
VALVE
Filed Oct. 20, 1948    2 Sheets-Sheet 1
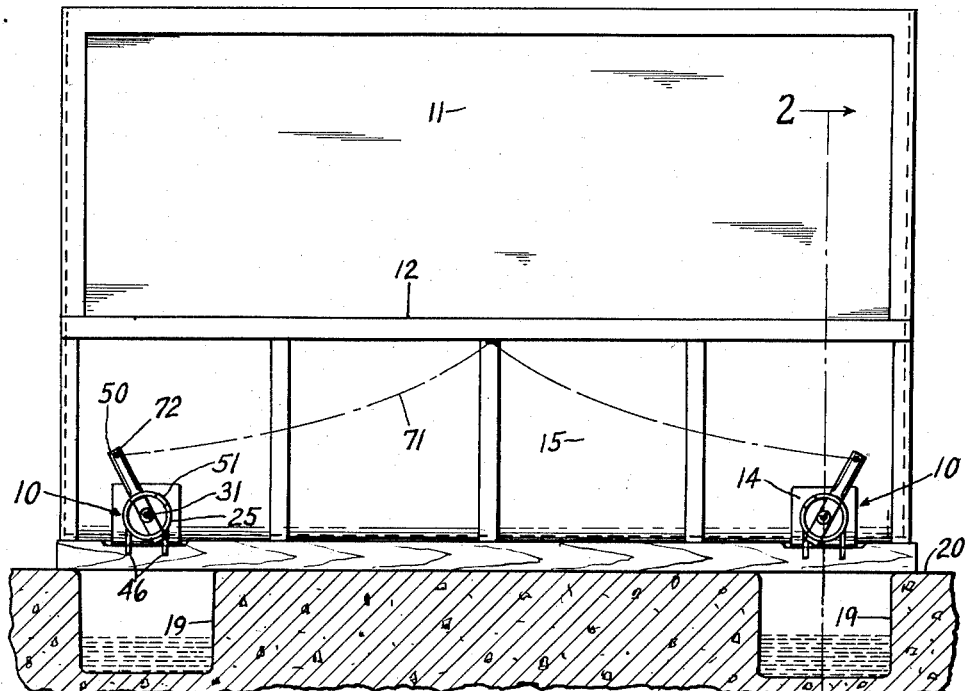
Fig. 1
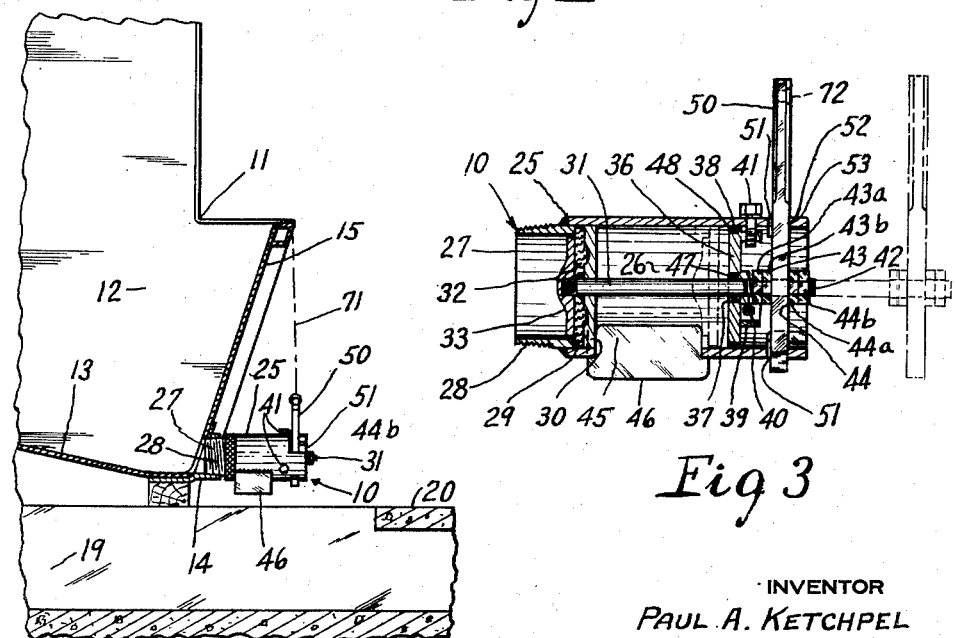
Fig. 2
Fig. 3
INVENTOR
PAUL A. KETCHPEL
HERMAN K. EGLI
By Irving Seidman
ATTORNEY.

Feb. 16, 1954   P. A. KETCHPEL ET AL   2,669,414
VALVE
Filed Oct. 20, 1948   2 Sheets-Sheet 2
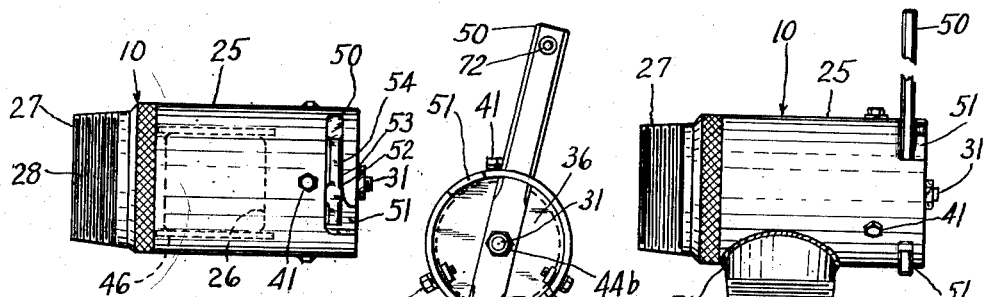
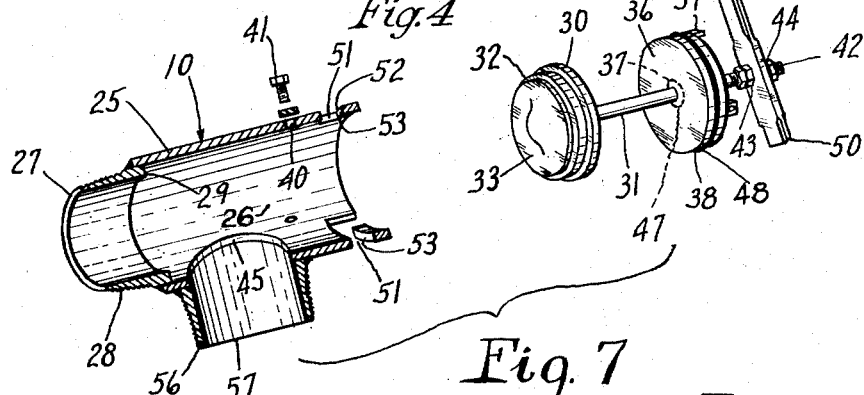
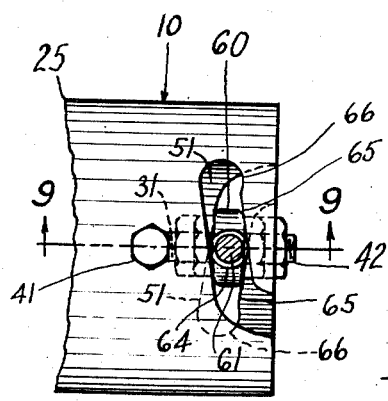
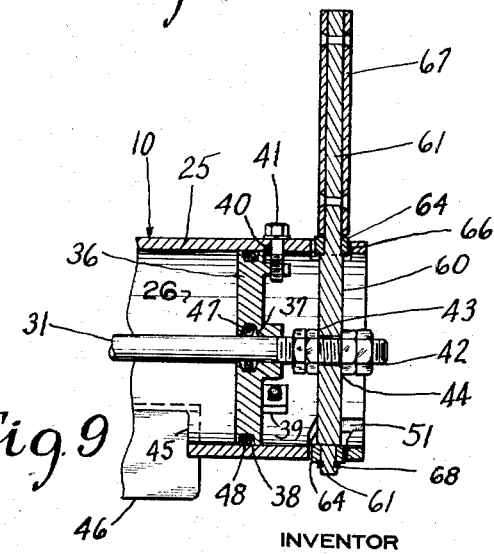
INVENTOR
PAUL A. KETCHPEL
HERMAN K. EGLI
BY Irving Seidman
ATTORNEY.

Patented Feb. 16, 1954

2,669,414

UNITED STATES PATENT OFFICE 2,669,414

VALVE

Paul A. Ketchpel, Englewood, and Herman K. Egli, New Milford, N. J., assignors to Ketchpel Engineering Company, West Englewood, N. J., a corporation Application October 20, 1948, Serial No. 55,626

5 Claims. (Cl. 251—40)

Our invention relates to improvements in valves and more particularly to low pressure drain valves for dye vats, tanks, kettles and the like.

In the chemical industry and especially the dyeing industry the dyeing solution must be maintained at a temperature of 212° F. The amount of muriatic acid used in the solution is so corrosive that ordinary brass valves disintegrate and have to be replaced after six months of service.

There is also the problem of extraneous strings, short pieces of cloth cuttings, etc., which float free of the cloth being dyed, interfering with the closing of metal seat valves.

The construction of valves now known in the industry does not permit easy removal of this extraneous material. Costly dismantling of the plumbing has to be done often to remove this extraneous material. Furthermore, when disintegration sets in on the valve seat and the gate and other parts, these types of valves leak and result in expensive and wasteful operation.

While it has been well recognized that valves made of stainless steel would provide three to five times the life of brass, still valves of ordinary design when made of stainless steel have not been accepted because of their high price. This results from both the high cost of stainless steel and tremendous high cost of machining complicated valves when made from this material. On the other hand, wrought metal has a lower base price, and being less ductile than a casting, a valve made of wrought stainless steel is more rigid and can better resist deformation during machining operations, or from use of large pipe wrenches when assembling the valve to the tank dye tubs.

One object of this invention is to provide a valve which is simple in construction and which can be fabricated or cast economically of stainless steel and will be compact and simple and require little machine work on it.

Another object is to provide a right angle valve which will be free of obstructions, orifices, bosses, cavities, or abutments which would restrict, cause eddies or subject the stream of liquid to turbulences, or on which extraneous materials may become lodged and restrict the full flow of the pipe line.

Another object is to provide a valve that is free from cavities, quick acting, easily cleaned, quickly and easily disassembled for use in a dairy, and other industries where valves must be disassembled and washed at the end of each day or before using it for different material.

Another object is to provide a valve which can be fabricated with little cost by welding it together of standard stock parts with either male or female fittings.

Another object is to provide a valve which is closed by its handle operating in a bayonet lock slot.

Another object is to provide a means for unlocking a valve of this type by remote control and utilizing the pressure of the liquid it is sealing for opening the valve.

These and other objects will be apparent from the reading of the following detailed description and claims in connection with the accompanying drawings, in which:

Figure 1 is an end view of two valves installed on a dye tub.

Figure 2 is a view taken along the line 2—2 in Figure 1 showing one of the valves in elevation and part of the dye tub in cross section.

Figure 3 is an enlarged cross sectional view of the valve, shown on the line 2—2 of Figure 1 and is somewhat diagrammatic.

Figure 4 is enlarged view of the valve shown in Figure 1.

Figure 5 is a plan view of the valve shown in Figure 1.

Figure 6 is an elevational view illustrating how the valve may be fabricated from stock parts with various type fittings.

Figure 7 is an exploded sectional view illustrating the valve disassembled and showing the valve body in section.

Figure 8 is a modified form of handle provided with rollers for engaging the bayonet lock slots.

Figure 9 is a sectional view taken on the line 9—9 of Figure 8 of the modified handle.

Referring to the drawings, the valve 10 is shown in Figure 1 installed in a dye tub 11 which is commonly found in the textile industry for dyeing cloth. The dye tub 11 comprises a rectangular stainless steel tank 12 provided with a sloping bottom 13. A coupling 14 is welded in the front wall or apron 15 of the tank 12 at the lower left and right corners, through which the tank is drained. Heretofore, a nipple was screwed into this coupling and to it was screwed a straight valve; then another nipple screwed into the valve and then an elbow screwed into the nipple to direct the discharge down into one of many trenches 19 which are below the dyehouse floor 20. By making our valve of angular construction and providing its inlet end with a male thread so that it may be screwed directly into the tank, it eliminates a great deal of piping and plumbing.

Solutions comprising water, muriatic acid, sodium chloride, brine and dye commonly used at 212° F. for dyeing processes result in a condition which is highly corrosive to ordinary brass valves now being used and they last a relatively short period of time. Our stainless steel drain valve has demonstrated that it has long life in this service as well as fulfilling the other objects of this invention as will now be described in detail.

The valve 10 comprises a tubular valve body 25 provided with an angular passageway 26. A short nipple 27 of the next size smaller pipe is welded into the inlet end of the valve body 25 and is provided with a male thread 28 for engagement in the coupling 14 of the dye tank 12. The inner end of the nipple is machined and provided with a valve seat 29 for the valve piston 30, welded on the valve rod 31 and provided with a rubber like seal member or sealing disc 32 which may be held to the valve piston 30 by a streamlined plate 33 mounted on that portion of the valve rod 31 which extends forward of the valve piston 30. It should be noted that the valve seat 29 is on the discharge end of the nipple 27 and does not offer any resistance to the flow of liquid.

As the valve piston 30 is moved to the rear to open the passageway 26, the valve piston 30 is guided in the valve body 25 while the rod is guided in an aperture 35 in the back wall 36. The back wall 36 is provided with an internal groove 37 and external groove 38 in which suitable size O rings 47 and 48 are used to prevent leakage of liquid past the back wall 36 which they can do very efficiently with only rough loose fit between the back wall 36 and the inside diameter of the valve body 25 which permits lower machine costs. This back wall 36 has three nuts or lugs 39 welded to it and the valve body 25 has three apertures or bolt holes 40 in line with the lugs 39 and the three bolts 41 hold the back wall 36 firmly in the valve body 25.

The valve rod 31 is provided with a thread 42 at its rear end. A forward shoulder 43 is provided on the valve rod 31 when nuts 43a and 43b are screwed on the valve rod 31 and locked against each other. Likewise, a rearward shoulder 44 is provided on the valve rod 31 when nuts 44a and 44b are screwed on it and locked against each other, spaced apart from nuts 43a and 43b.

A valve handle 50 is pivotally mounted on the valve rod 31 between the shoulders 43 and 44 and extends out at both ends beyond the radius of the valve body 25 for engaging bayonet lock slots 51 which are symmetrically located at its rear end. The rearmost sides 52 of the slots 51 have a sloping surface or a cam 53 formed thereon against which the handle 50 presses when rotated and in turn moves against the shoulder 43 and forces the sealing disc 32 against the valve seat 29 to close the valve 10 as the handle 50 comes to rest in the locking seat 54. When the valve 30 is moved all the way to the right (as shown by the dot and dash lines in Figure 3) against the back wall 36, the passageway 26 is fully open and liquid may flow through the nipple 27 into the valve body 25 and discharge therefrom in an angular direction through the aperture 45 provided in the lower wall of the valve body 25.

For cheapness of construction the aperture may be burned in the valve body 25 and a guide plate 46 welded on each side of the aperture 45 to direct the discharge therefrom within the confines of the trench. If desired, the valve body 25 may be cut with a torch at the sides along a longitudinal line at the bottom and the two wings pressed down to form such guide plates 46. With either style of guide plates 46 free access is permitted for inserting a hand, or a prod, or a hook up through the aperture 45 and into the valve body 25 to catch hold of extraneous materials which lodge at the mouth of the valve 10.

However, it will be readily understood from Figure 7, that one of the chief advantages of this valve is the ease and speed with which it can be disassembled, or assembled by simply removing the three bolts 41 and pulling the entire piston assembly out of the valve body 25 and permitting unrestricted access to the mouth of the valve 10 or for replacing the O-rings 47 and 48 in the back wall 36.

As shown in Figures 5 and 7 when a branch line 56 is desired a pipe fitting 57 may be welded onto the valve body 25 over the aperture 45. In this case the aperture 45 can be most easily cut with a hole saw which will cut a true and smooth circular opening. The nipple 27 and pipe fitting 54 are stock items and it should be readily seen that either male or female fittings can be welded in the valve body 25 and result in considerable economy from the fewer parts which need to be carried in stock ready for fabrication. It should also be noted here that the branch line 56 could be welded at angles greater than 90° shown by the drawings probably up to 135° for purposes where a little restriction of the passageway is not critical.

The shoulders 43 and 44 are readily adjustable along the valve rod 31 to compensate for compression or wear on the sealing disc 32, or of wear between the metal surfaces of the handle 50 and the cam 53 even though the latter are usually kept lubricated.

A modified form of construction is shown in Figures 8 and 9 in which the modified handle 60 is reduced in diameter as at 61 and 62 equipped with cam rollers 63 and 64 which roll on the cam surfaces 65 in the bayonet lock slots 51 with less friction and finally engage the seat 66 in the cam surface 65. The rollers 61 and 62 are suitably retained by the tube 67 and snap ring 68 secured to the handle 60.

In operation, the liquid in the dye tubs may be emptied as frequently as one to two hours intervals, so the time required to drain the tank is a significant percentage of the total cycle. Therefore, it is essential that the valve can be capable of being opened and closed quickly and its internal passageway be efficient in conducting the liquid through the valve.

The present invention is very rapid in operation. The valve handle 50 need only be pulled free from the bayonet lock slot 51 and the pressure of the liquid immediately pushes the valve fully open. By making the valves with right or left bayonet lock slots 51 for the right and left sides of the dye tank, the operator who stands at the center can simply pull the handle 50 toward him to open the valves. Cords 71 are tied to a hole 72 in the handles 50 and are also attached to a screw in the apron 15 at the center of the tank for pulling the valve open without having to leave the central position where he is watching the bolt of cloth as it winds over and over on large wooden reels in the dye tub 11.

The valve may be quickly closed by pushing endwise on the valve rod 31 until the valve sealing disc 32 on the front of the valve 30 is against the seat 29 and then turning the handle 50 to lock it in the bayonet lock slots 51. Sometimes the operator does this with his foot and the right and left operating handles prove useful for him as he can slide the valve rod 31 in and push the handles away from him with only his foot until they engage the locking seat 54.

While we have explained the advantages of the construction of this valve when made of stainless steel it can also be made of bronze, cast iron, plastic, die castings, glass, hard rubber, or ceramics.

We claim:

1. In a valve, a valve body, a passageway with an inlet and an outlet in said valve body, the medial axis of each said inlet and outlet being positioned angularly to each other, said valve body comprising an external housing made from commercial wrought tubing and being reduced in diameter at one end by a nipple being welded into the external housing, the external end of said nipple being threaded for mounting said valve and the internal end providing a valve seat, a back wall mounted in said valve body with liberal clearance, said back wall having an aperture at its center, a piston valve slidably mounted in said valve body for cooperating with said valve seat to close said passageway, said piston valve provided with a valve rod which is slidably mounted in said aperture in said back wall, said back wall provided with external and internal grooves, compressible sealing members mounted in said grooves to effect a tight seal between said valve body and said piston rod, said back wall being held in position by means extending laterally through apertures in the wall of said valve body, said valve rod extending to the back end of said valve body and valve actuating means mounted on said valve rod and cooperating with means associated with said valve body to close said valve, said means associated with said body arranged to permit the valve actuating means to disengage therefrom when the valve piston is slid longitudinally to open the valve.

2. In a valve, a valve body, a passageway with an inlet and an outlet in said valve body, the medial axis of each said inlet and outlet being positioned angularly to each other, said valve body being fabricated from commercial size tubing, comprising an external tube and an internal tube which are joined together, the external end of said internal tube providing the means for mounting the valve, the internal end of said internal tube providing a valve seat in said passageway, said valve body having an aperture in its side wall providing the outlet from said passageway, a back wall mounted in the opposite end of said valve body and provided with an aperture for a valve rod, a valve piston slidably mounted in said valve body and coacting with said valve seat to close said passageway, said piston valve provided with a valve rod which is slidably mounted in the aperture in said back wall, said valve rod extending to the operating end of said valve body and a means cooperating with said valve rod and the operating end of said valve body for closing said passageway without rotating said valve.

3. In a valve, a valve body, a passageway with an inlet and an outlet in said valve body, the medial axis of each inlet and outlet being positioned angularly to each other, a valve seat in said passageway formed by a slight reduction in diameter in the longitudinal run of said valve body, a back wall mounted in the opposite end of said valve body with liberal clearance, said back wall having an aperture in which a valve rod may be mounted with liberal clearance, said back wall provided with external and internal grooves, compressible sealing members mounted in said grooves for providing a seal between it and the valve body and the valve rod, a valve piston slidably mounted in said valve body for cooperating with said seat to close said passageway, said valve piston provided with a valve rod which is slidably mounted in said aperture in said back wall, said valve rod extending to the back end of said valve body and provided with adjustable spaced shoulders, a valve handle pivotally mounted on said valve rod between said spaced shoulders and extending at right angles across the end of said valve body, the back end of said valve body provided with apertures extending radially through its wall and with bayonet lock slots cut laterally therethrough and opening out through the rear end of said valve body, said valve being adaptable for quickly closing by a longitudinal movement of said handle, until it engages said bayonet slots in said valve body and then squeezes the valve piston tight against said seat as said handle is turned in said bayonet lock slots, said back wall being provided with fastening seats, fastening means passing through said radial apertures in said valve body and engaging said fastening seats to support said back wall whereby access to said passageway or parts difficult to clean or requiring sterilizing may all be quickly removed upon disassembling said fastening means.

4. In a valve body, a passageway with an inlet and an outlet in said valve body, the medial axis of each inlet and outlet being positioned angularly to each other, said valve body comprising an external housing made from commercial wrought tubing and being reduced at one end by a pipe nipple being welded into the external housing, the outer end of said pipe nipple being threaded for mounting said valve body, the inner end of said pipe nipple providing a valve seat in said valve, a back wall mounted in the opposite end of said valve body with clearance, said back wall having an aperture in which said valve rod may be mounted with clearance, said back wall provided with external and internal grooves, O rings mounted in said grooves for providing a seal between it and the valve body and valve rod, a valve piston slidably mounted in said valve body for cooperating with said seat to close said passageway, said valve piston provided with a valve rod which is slidably mounted in said aperture in said back wall, said valve rod extending to the back end of said valve body and provided with spaced shoulders, a valve handle pivotally mounted on said valve rod between said spaced shoulders and extending at right angles across the end of said valve body, the back end of said valve body provided with bolt holes extending radially through its walls and with cam surfaces that extend to the end of said valve body and receive and cooperate with said valve handle, said valve being arranged for quick closing by a longitudinal movement of said handle until it engages the cam surfaces on said valve body and then squeezes the valve piston tight against said seat as said handle is turned while cooperating with said cam surfaces said back wall being provided with threaded holes and being fastened to said valve body by bolts passing through said radial apertures whereby access to said passageway or parts difficult to clean or requiring sterilizing may all be quickly removed upon disassembling of said bolts.

5. A valve constructed in accordance with claim 3 in which means is provided on said valve body adjacent to said aperture to direct the flow of liquids discharged therefrom.

PAUL A. KETCHPEL.
HERMAN K. EGLI.

References Cited in the file of this patent

UNITED STATES PATENTS

| Number | Name | Date |
|---|---|---|
| 247,506 | Lillis | Sept. 27, 1881 |
| 614,517 | Taylor | Nov. 22, 1898 |
| 964,615 | Cordley | July 19, 1910 |
| 965,343 | Strong | July 26, 1910 |
| 1,238,926 | Long | Sept. 4, 1917 |
| 1,503,132 | Prator | July 29, 1924 |
| 1,654,550 | Muend | Jan. 3, 1928 |
| 1,727,169 | Hengesbach | Sept. 3, 1929 |
| 1,935,329 | Needham | Nov. 14, 1933 |
| 2,012,873 | Gillen | Aug. 27, 1935 |
| 2,092,261 | Rector | Sept. 7, 1937 |
| 2,492,006 | Raybould | Dec. 20, 1949 |

FOREIGN PATENTS

| Number | Country | Date |
|---|---|---|
| 56,821 | Norway | of 1937 |